United States Patent
Yip et al.

(10) Patent No.: US 12,437,573 B2
(45) Date of Patent: Oct. 7, 2025

(54) COUNTERFEIT DETECTION USING IMAGE ANALYSIS

(71) Applicant: Capital One Services, LLC, McLean, VA (US)

(72) Inventors: Samuel Yip, East Brunswick, NJ (US); Mario A. Garcia, Arlington, VA (US); Roberto Irizarry, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 359 days.

(21) Appl. No.: 18/301,372

(22) Filed: Apr. 17, 2023

(65) Prior Publication Data

US 2024/0346843 A1    Oct. 17, 2024

(51) Int. Cl.
*G06V 30/42* (2022.01)
*G06V 10/82* (2022.01)
*G06V 30/418* (2022.01)

(52) U.S. Cl.
CPC .............. *G06V 30/42* (2022.01); *G06V 10/82* (2022.01); *G06V 30/418* (2022.01)

(58) Field of Classification Search
CPC ...... G06V 30/42; G06V 10/82; G06V 30/418; G06V 30/40; G06V 30/413; G06V 30/414
See application file for complete search history.

(56) References Cited

U.S. PATENT DOCUMENTS

| | | | |
|---|---|---|---|
| 2016/0247018 A1* | 8/2016 | Srivastava | G06Q 40/02 |
| 2020/0184211 A1* | 6/2020 | Fowles | G06Q 20/14 |
| 2022/0012696 A1* | 1/2022 | Van der Merwe | G07F 19/202 |

OTHER PUBLICATIONS

Prakash et al., "Deep Learning approaches for Automated Detection of Fake Indian Banknotes, " ieeexplore.ieee.org (Year: 2023).*
Jadhav et al., "Currency Identification and Forged Banknote Detection using Deep Learning," ieeexplore.ieee.org (Year: 2019).*
Ali et al., "DeepMoney: counterfeit money detection using generative adversarial networks," pmc.ncbi.nlm.nih.gov (Year: 2019).*
Agasti et al., "Fake currency detection using image processing," TOP Conf. Series: Materials Science and Engineering 263, 2017, 9 Pages.

* cited by examiner

*Primary Examiner* — Vu Le
*Assistant Examiner* — Rachel Anne Ometz
(74) *Attorney, Agent, or Firm* — Harrity & Harrity, LLP

(57) ABSTRACT

In some implementations, a device may obtain a first image of a first note, and identify a first identifier associated with the first note and a first set of visual characteristics of the first note indicating an appearance of the first note. The device may obtain a second image of a second note, and identify a second identifier associated with the second note and a second set of visual characteristics of the second note indicating an appearance of the second note. The second identifier may correspond to the first identifier, indicating that the second note is purported to be the first note. The device may determine whether the second note is counterfeit based on the first set of visual characteristics of the first note and the second set of visual characteristics of the second note. The device may perform action(s) based on a determination that the second note is counterfeit.

20 Claims, 10 Drawing Sheets

COUNTERFEIT DETECTION USING IMAGE ANALYSIS

BACKGROUND

Image analysis is the extraction of meaningful information from images, such as the extraction of information from digital images using digital image processing techniques. Digital image analysis or computer image analysis uses a computer or electrical device to study an image to obtain useful information from the image. Image analysis can involve computer vision or machine vision, and may use pattern recognition, digital geometry, and signal processing.

SUMMARY

Some implementations described herein relate to a system for counterfeit detection using image analysis. The system may include one or more memories and one or more processors communicatively coupled to the one or more memories. The one or more processors may be configured to obtain a first image of a first note that is provided to a user from an entity. The one or more processors may be configured to identify, based on the first image, a first identifier associated with the first note and a first set of visual characteristics of the first note indicating an appearance of the first note. The one or more processors may be configured to obtain a second image of a second note that is incoming to the entity. The one or more processors may be configured to identify, based on the second image, a second identifier associated with the second note and a second set of visual characteristics of the second note indicating an appearance of the second note, where the second identifier corresponds to the first identifier indicating that the second note is purported to be the first note. The one or more processors may be configured to determine, using a machine learning model, whether the second note is counterfeit based on the first set of visual characteristics of the first note, the second set of visual characteristics of the second note, and at least one of an occupation of the user or an interaction history associated with the user. The one or more processors may be configured to transmit, based on a determination that the second note is counterfeit, an indication that the second note is counterfeit.

Some implementations described herein relate to a method of counterfeit detection using image analysis. The method may include obtaining, by a device, a first image of a first note provided to a user. The method may include identifying, by the device and based on the first image, a first identifier associated with the first note and a first set of visual characteristics of the first note indicating an appearance of the first note. The method may include obtaining, by the device and subsequent to the first note being provided to the user, a second image of a second note. The method may include identifying, by the device and based on the second image, a second identifier associated with the second note and a second set of visual characteristics of the second note indicating an appearance of the second note, where the second identifier corresponds to the first identifier indicating that the second note is purported to be the first note. The method may include determining, by the device and using a machine learning model, whether the second note is counterfeit based on the first set of visual characteristics of the first note, the second set of visual characteristics of the second note, and data associated with the user. The method may include transmitting, by the device and based on a determination that the second note is counterfeit, an indication that the second note is counterfeit.

Some implementations described herein relate to a non-transitory computer-readable medium that stores a set of instructions for counterfeit detection using image analysis. The set of instructions, when executed by one or more processors of a device, may cause the device to obtain a first image of a first note provided to a user. The set of instructions, when executed by one or more processors of the device, may cause the device to identify, based on the first image, a first identifier associated with the first note and a first set of visual characteristics of the first note indicating an appearance of the first note. The set of instructions, when executed by one or more processors of the device, may cause the device to obtain a second image of a second note. The set of instructions, when executed by one or more processors of the device, may cause the device to identify, based on the second image, a second identifier associated with the second note and a second set of visual characteristics of the second note indicating an appearance of the second note, where the second identifier corresponds to the first identifier indicating that the second note is purported to be the first note. The set of instructions, when executed by one or more processors of the device, may cause the device to determine whether the second note is counterfeit based on the first set of visual characteristics of the first note and the second set of visual characteristics of the second note. The set of instructions, when executed by one or more processors of the device, may cause the device to perform one or more actions based on a determination that the second note is counterfeit.

DETAILED DESCRIPTION

Figure 1A:
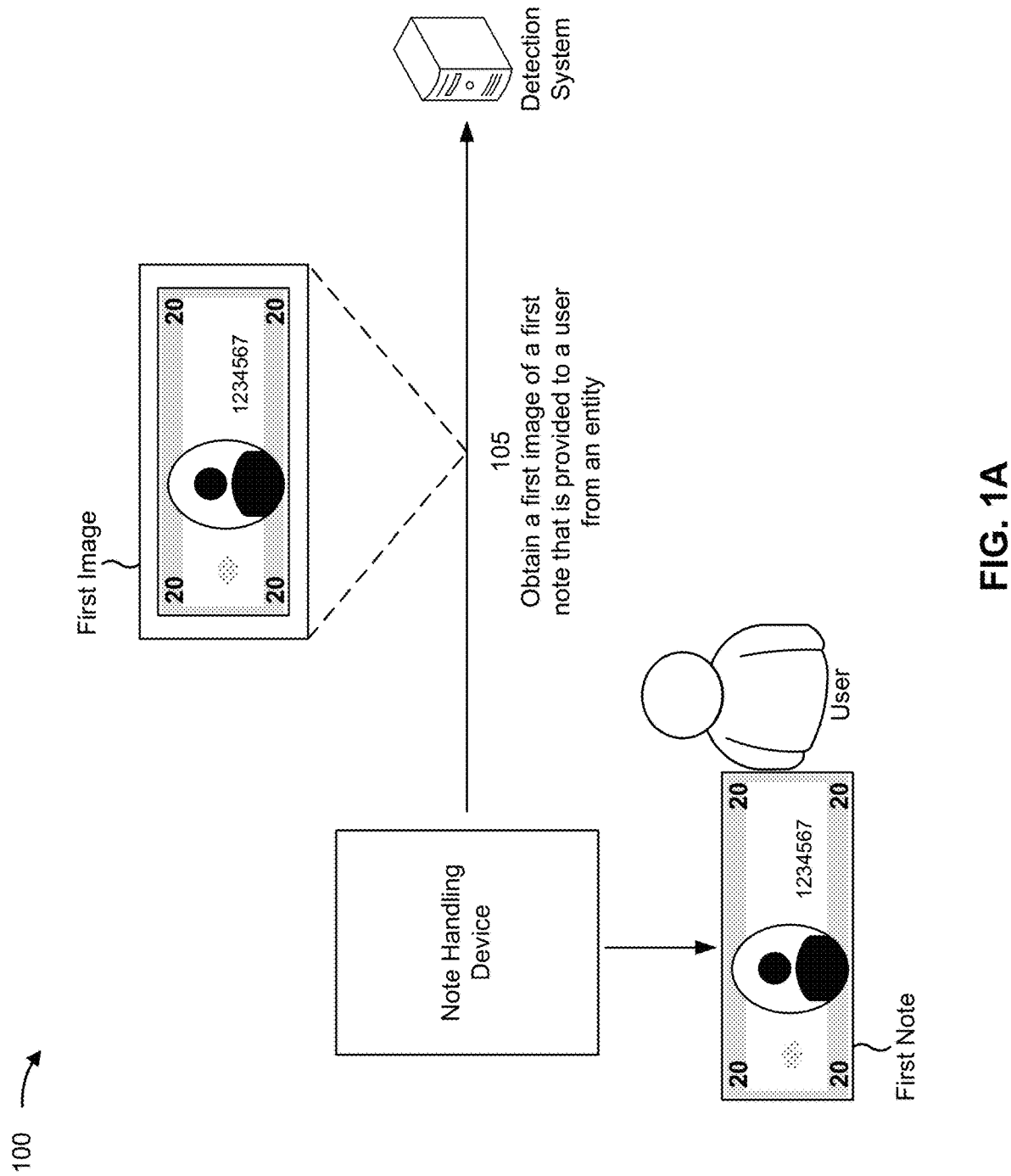
FIGS. 1A-1F are diagrams of an example associated with counterfeit detection using image analysis, in accordance with some embodiments of the present disclosure.

The following detailed description of example implementations refers to the accompanying drawings. The same reference numbers in different drawings may identify the same or similar elements.

As described herein, image analysis may be performed to extract information from a digital image using one or more digital image processing techniques. In some examples, image analysis may be performed on currency to identify counterfeits. For example, a digital image of currency may be captured to identify whether the features of the currency, such as a serial number, a watermark, and/or a security thread, are indicative of authenticity. However, image analysis performed in this manner may be unable to account for various wear, discoloration, and/or damage present in circulated currency. Accordingly, counterfeit detection relying on the image analysis may have low accuracy, resulting in significant computing resources (e.g., processor resources, memory resources, or the like) being expended to perform the image analysis in instances that fail to identify counterfeit currency or that falsely identify authentic currency as counterfeit.

Some implementations described herein provide detection of counterfeit currency using machine learning and image analysis of multiple images of currency captured at different times. In some implementations, a first image of a first note may be captured when the first note is provided to a user from an entity (e.g., in connection with a withdrawal), and a second image of a second note, having a same identifier (e.g., serial number) as the first note, may be captured when the second note is incoming to the entity (e.g., in connection with a deposit). The first image may be processed to identify a first set of visual characteristics of the first note indicating an appearance of the first note, and the second image may be processed to identify a second set of visual characteristics of the second note indicating an appearance of the second note. The visual characteristics of a note may relate to damage (e.g., rips or stains) to the note, a coloration (e.g., discoloration or fading) of the note, and/or a quality (e.g., a translucency) of the note.

A machine learning model may determine that the second note is counterfeit based on the first set of visual characteristics, the second set of visual characteristics, and data associated with the user, such as an occupation of the user and/or interaction data associated with the user (e.g., indicating historical transactions in connection with a transaction card of the user). For example, the machine learning model may be trained to classify the note as counterfeit if differences in appearance between the first note and the second note are inconsistent with a handling of the first note that would be expected based on the occupation and/or the interaction history of the user (e.g., currency handled by a landscaper would be expected to be dirtier than currency handled by a doctor). In this way, counterfeit currency may be detected with improved accuracy, thereby providing efficient utilization of computing resources used for counterfeit detection.

FIGS. 1A-1F are diagrams of an example 100 associated with counterfeit detection using image analysis. As shown in FIGS. 1A-1F, example 100 includes a detection system, one or more note handling devices, one or more user devices, one or more server devices, and one or more databases (e.g., a note database, a user database, and/or an interaction database). These devices are described in more detail in connection with FIGS. 3 and 4. The detection system may be associated with an entity, such as a financial institution, that provides services in connection with the withdrawal of notes (e.g., cash) from the entity (e.g., from an account maintained by the entity) and the deposit of notes to the entity (e.g., to an account maintained by the entity). The note handling device(s) may also be associated with the entity, and the note handling device(s) may dispense withdrawn notes or accept deposited notes. For example, a note handling device may be an automated teller machine (ATM), a cash dispenser used by a bank teller, or the like. The server device(s) may also be associated with the entity, and the server device(s) may process information relating to accounts maintained by the entity and/or process information relating to counterfeit incidents. A user device may be associated with a user (e.g., a customer) having an account maintained by the entity. Additionally, or alternatively, a user device may be associated with the entity (e.g., associated with a bank teller of the entity or counterfeit investigation personnel of the entity).

As shown in FIG. 1A, a note handling device may dispense a first note for a user (e.g., in connection with a withdrawal performed by the user). For example, the note handling device (e.g., an ATM) may dispense the first note directly to the user. As another example, the note handling device (e.g., a cash dispenser used by a bank teller) may dispense the first note to a bank teller, or other intermediary, for the user. In connection with dispensing the first note, the note handling device may capture a first image of the first note (e.g., using a camera, a scanner, or another type of image sensor). In some implementations, the first note may be manually dispensed to the user (e.g., by a bank teller from a cash drawer) rather than dispensed by the note handling device. Here, a bank teller, or other intermediary, may use an image capture device (e.g., a camera, a scanner, or another type of image sensor) to capture the first image of the first note. In some implementations, the note handling device and/or the image capture device may be a component of the detection system (e.g., the detection system may capture the first image of the first note). In some implementations, the user may use a user device to capture the first image of the first note. For example, the user device may be provisioned with an application configured to cause capturing of images and to exchange information with the detection system in connection with counterfeit detection.

As shown by reference number 105, the detection system may obtain the first image of the first note that is provided to the user from the entity, such as in connection with a withdrawal performed by the user. For example, the detection system may receive the first image from the note handling device that captured the first image. As another example, the detection system may receive the first image from the image capture device that captured the first image. As a further example, the detection system may receive the first image from the user device that captured the first image.

Figure 1B:
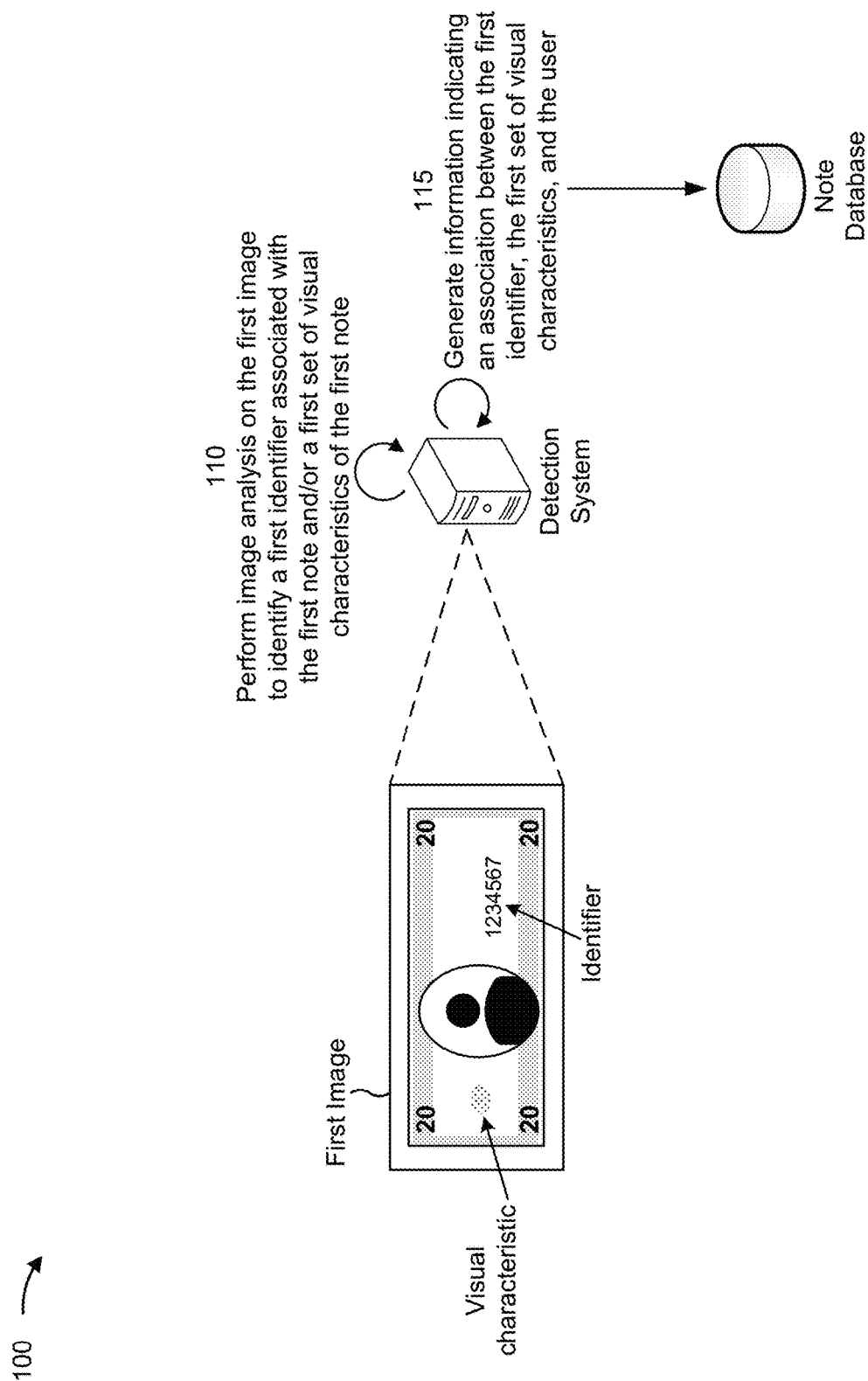

As shown in FIG. 1B, and by reference number 110, the detection system may perform image analysis on the first image. The detection system may perform the image analysis to identify a first identifier (e.g., a serial number) associated with the first note and/or a first set of visual characteristics of the first note that indicate an appearance of the first note. The image analysis may include performing one or more image processing techniques on the first image to extract the relevant information from the first image. The image processing techniques may include performing edge detection on the first image, cropping the first image, adjusting a color balance of the first image, converting the first image to grayscale, adjusting a brightness of the first image, adjusting a contrast of the first image, performing noise reduction of the first image, performing segmentation of the first image, and/or performing feature extraction from the first image.

The image analysis may include performing one or more computer vision or machine vision techniques on the first image (e.g., that has been processed by the image processing techniques). Thus, the detection system may identify the first set of visual characteristics based on performing the computer vision or machine vision techniques. The visual characteristics may include damage to the first note (e.g., one or more rips, cuts, holes, missing portions, stray markings, stains, or the like, of the first note), a coloration of the first note (e.g., a color profile, a color intensity, a color layering, a discoloration, a color fading, or the like, of the first note), and/or a quality of the first note (e.g., a paper quality, a wear level, a translucency, or the like, of the first note). In some implementations, the image analysis may include performing optical character recognition (OCR) on at least a portion of the first image that is associated with the first identifier. Thus, the detection system may identify the first identifier based on a result of the OCR.

As shown by reference number 115, the detection system may generate information indicating an association between the first identifier, the first set of visual characteristics (e.g., which may be expressed as numerical data, alphanumerical data, and/or textual data, such as in one or more matrices, one or more vectors, one or more tensors, or the like), and the user that performed the withdrawal of the first note. This information may be stored in the note database for later use by the detection system when a note purported to be the first note is subsequently deposited to the entity.

Figure 1C:
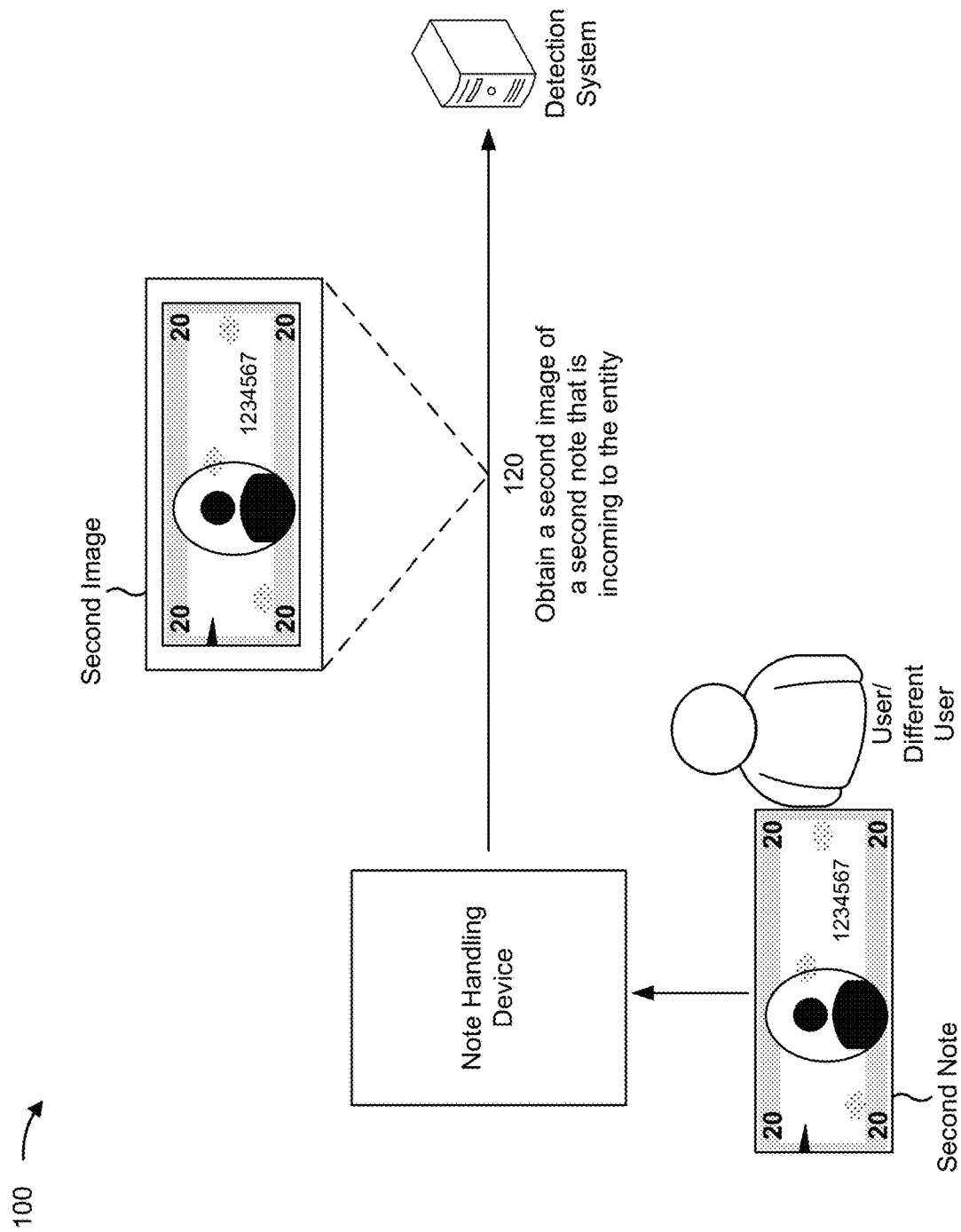

As shown in FIG. 1C, a note handling device (e.g., the same note handling device described in connection with FIG. 1A or a different note handling device) may receive a second note from the user or a different user (e.g., in connection with a deposit performed by the user or the different user), in a similar manner as described in connection with FIG. 1A. In connection with receiving the second note, the note handling device may capture a second image of the second note. In some implementations, the second note may be manually received, and a bank teller, or other intermediary, may use an image capture device (e.g., the same image capture device described in connection with FIG. 1A or a different image capture device) to capture the second image of the second note, in a similar manner as described in connection with FIG. 1A. In some implementations, the note handling device and/or the image capture device may be a component of the detection system (e.g., the detection system may capture the second image of the second note). In some implementations, a user device may be used to capture the second image of the second note, in a similar manner as described in connection with FIG. 1A.

As shown by reference number 120, the detection system may obtain the second image of the second note that is incoming to the entity, such as in connection with a deposit. For example, the detection system may receive the second image from the note handling device that captured the second image, from the image capture device that captured the second image, or from the user device that captured the second image. The detection system may obtain the second image subsequent to the first note being provided to the user. For example, the deposit of the second note may occur after (e.g., one or more hours after, one or more days after, one or more weeks after, etc.) the withdrawal of the first note.

Figure 1D:
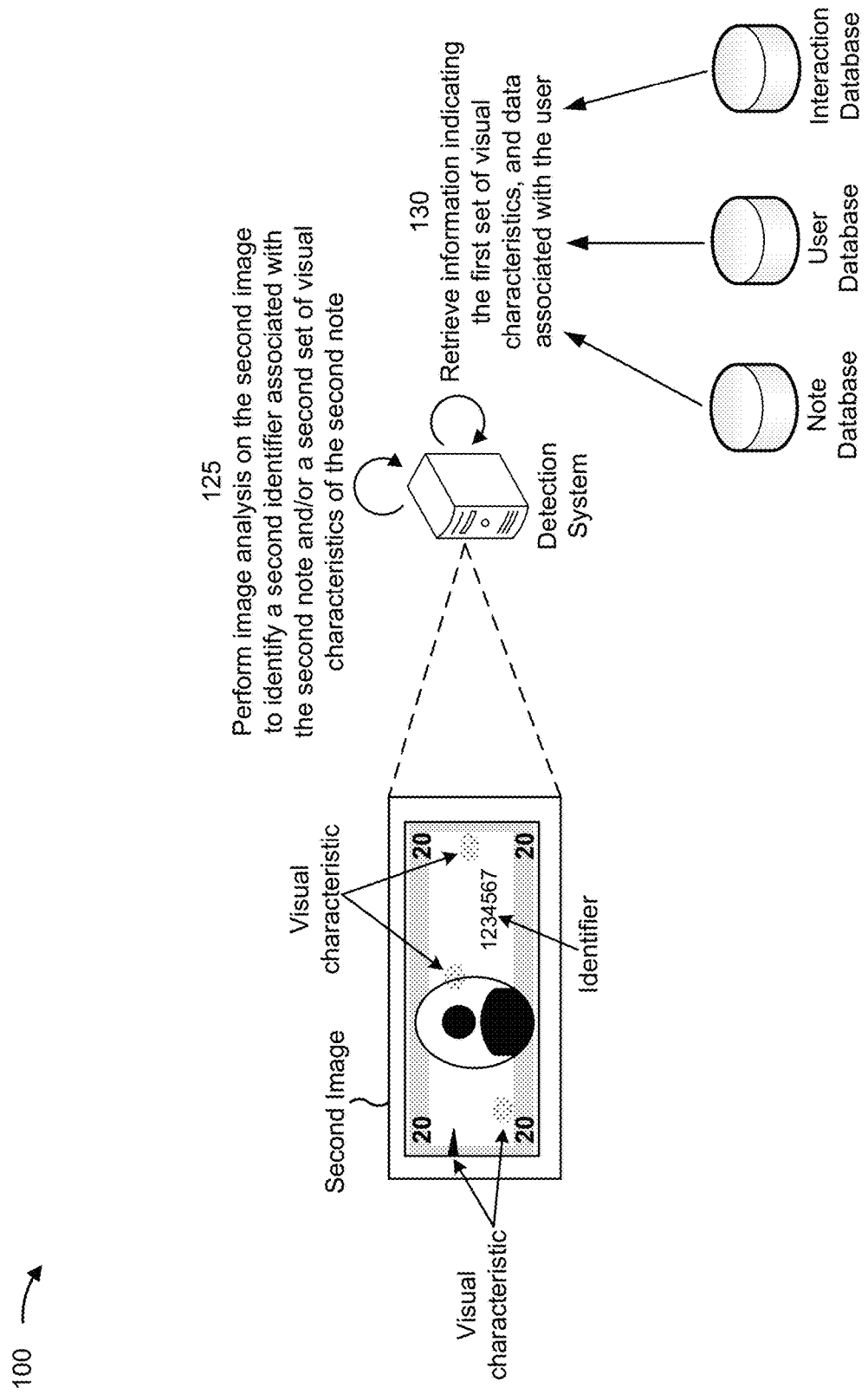

As shown in FIG. 1D, and by reference number 125, the detection system may perform image analysis on the second image. The detection system may perform the image analysis to identify a second identifier (e.g., a serial number) associated with the second note and/or a second set of visual characteristics of the second note that indicate an appearance of the second note. The image analysis may include performing one or more image processing techniques on the second image, performing one or more computer vision or machine vision techniques on the second image, and/or performing OCR on at least a portion of the second image that is associated with the second identifier, in a similar manner as described in connection with FIG. 1B. As described in connection with FIG. 1B, the visual characteristics may include damage to the second note, a coloration of the second note, and/or a quality of the second note.

The second set of visual characteristics may differ from the first set of visual characteristics. For example, the second set of visual characteristics may include one or more stains or rips of the second note that are not included in the first set of visual characteristics for the first note. The second identifier of the second note may correspond to the first identifier of the first note, thereby indicating that the second note is purported to be the first note (e.g., the second identifier corresponding to the first identifier indicates that the second note and the first note should be the same note). Based on the second identifier corresponding to the first identifier, as shown by reference number 130, the detection system may retrieve information indicating the first set of visual characteristics from the note database. In some implementations, the detection system may store the first image rather than processing the first image to identify the first set of visual characteristics at a time when the first image is withdrawn. Here, the detection system may perform image analysis of the first image to identify the first set of visual characteristics, as described herein, at a time when the second image is obtained, and therefore the note database may not be needed.

Furthermore, based on the second identifier corresponding to the first identifier, the detection system may retrieve data associated with the user, that performed the withdrawal of the first note, from the user database and/or the interaction database. The user database may include records relating to individuals that have accounts with the entity, and a record for an individual may indicate a residence location of the individual and/or an occupation of the individual, among other examples. The interaction database may include records relating to interactions (e.g., transactions) performed by individuals that have accounts with the entity, and a record for an interaction may indicate a merchant involved in the interaction, category associated with the merchant, a location of the merchant, a time and/or a date of the interaction, and/or an amount of the interaction, among other examples.

The data associated with the user may indicate an occupation of the user and/or an interaction history of the user. For example, the interaction history may indicate one or more historical interactions (e.g., transactions) between the user and one or more merchants in connection with an account (e.g., a credit card account or a debit card account) of the user maintained by the entity (e.g., which may indicate an expected behavior or a behavioral pattern of the user). The data associated with the user may enable the detection system to determine whether differences between an appearance of the first note and an appearance of the second note are consistent with a handling of the first note that would be expected (e.g., based on the occupation of the user and/or the interaction history of the user) between withdrawal and deposit. In some implementations, the detection system may retrieve data associated with the different user, that performed the deposit of the second note, from the user database and/or the interaction database, in a similar manner as described above.

Figure 1E:
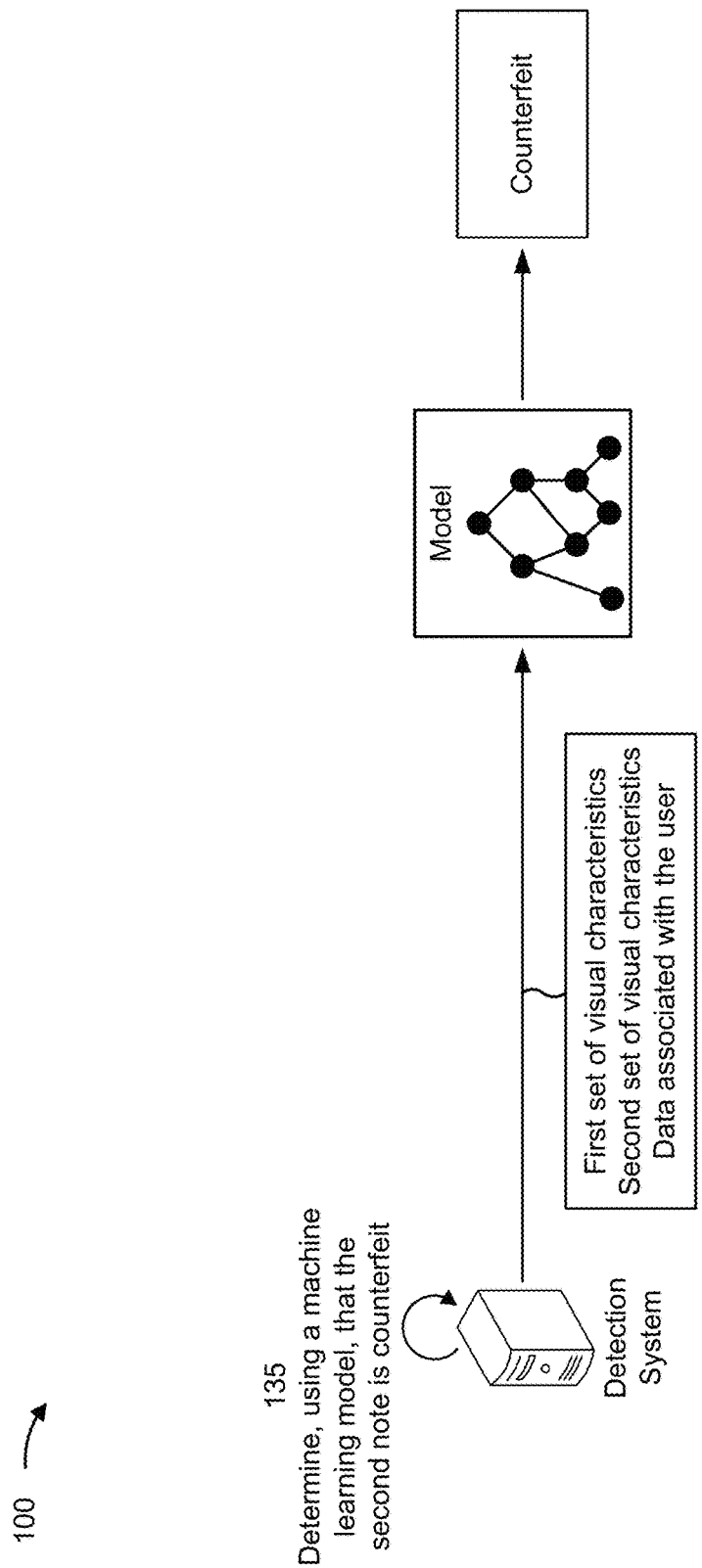

As shown in FIG. 1E, and by reference number 135, the detection system may determine, using a machine learning model, whether the second note is counterfeit. For example, the detection system may determine, using the machine learning model, whether the second note is counterfeit based on the first set of visual characteristics of the first note, the second set of visual characteristics of the second note, and the data associated with the user (e.g., which may be input to the machine learning model as one or more vectors, one or more matrices, one or more tensors, or the like). Information indicating the first set of visual characteristics and the second set of visual characteristics may be input to the machine learning model, or information indicating an intersection and/or a difference between the first set of visual characteristics and the second set of visual characteristics may be input to the machine learning model. In some implementations, the detection system may determine whether the second note is counterfeit further based on a first time of the first note being provided to the user (e.g., a withdrawal time), a second time of the second note incoming to the entity (e.g., a deposit time), a first location of the first note being provided to the user (e.g., a withdrawal location), and a second location of the second note incoming to the entity (e.g., a deposit location). Additionally, or alternatively, the detection system may determine whether the second note is counterfeit further based on the additional data associated with the different user (e.g., indicating an occupation of the different user and/or an interaction history of the different user). The machine learning model may be a classification model that is trained to classify a note into a first classification indicating that the note is counterfeit or into a second classification indicating that the note is authentic, based on one or more of the aforementioned variables.

The following examples demonstrate how the data associated with the user may be used by the machine learning model to classify the second note as counterfeit. As one example, the first note may be withdrawn in Chicago and the second note may be deposited in Seattle a day later (e.g., and the second note may have a different appearance than the first note), and the machine learning model may classify the second note as counterfeit if the interaction history associated with the user indicates that the user rarely travels outside of Chicago (e.g., the interaction history indicates a lack of interactions outside of Chicago) and/or if the user's occupation is not associated with long-distance travel (e.g., the user is a landscaper). As another example, the second note may be deposited into an account of a particular supermarket (e.g., and the second note may have a different appearance than the first note), and the machine learning model may classify the second note as counterfeit if the interaction history associated with the user indicates that the user performs interactions involving only a different supermarket. As a further example, the second note may have stains that are not present on the first note (e.g., the second note may have a different appearance than the first note), and the machine learning model may classify the second note as authentic if the interaction history associated with the user indicates that the user engages in activities in which cash may be handled in a manner that has a high probability of causing stains (e.g., the user frequently plays golf or frequently goes to bars) and/or if the user has an occupation in which cash may be handled in a manner that has a high probability of causing stains (e.g., the user operates a food truck).

Figure 1F:
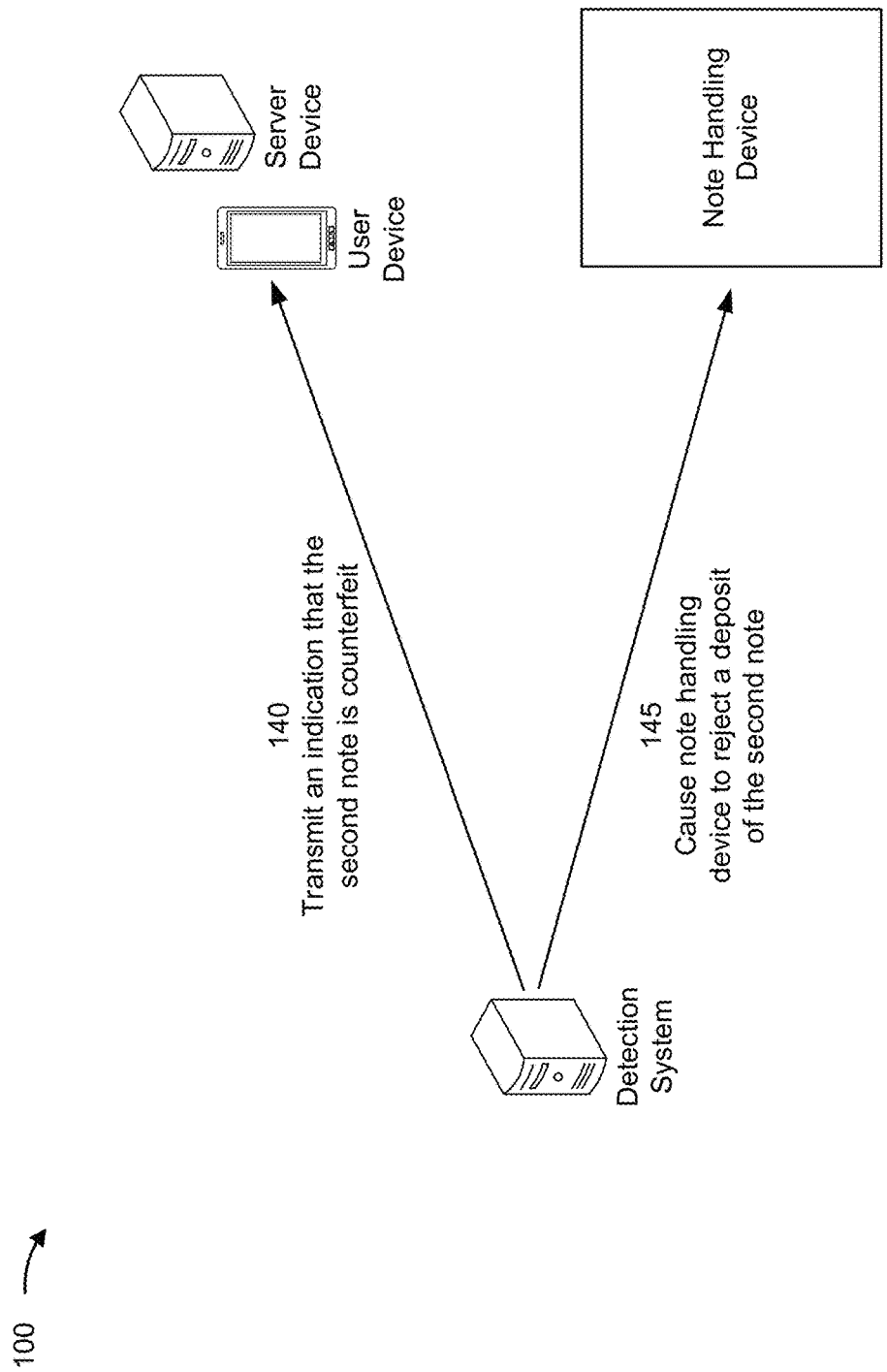

As shown in FIG. 1F, the detection system may perform one or more actions based on a determination that the second note is counterfeit. As shown by reference number 140, an action may include transmitting an indication that the second note is counterfeit. The detection system may transmit the indication to a user device, such as a user device that captured the first image of the first note or the second image of the second note using a counterfeit detection application, as described herein, or a user device used by a bank teller of the entity (e.g., that received the second note for deposit) or used by counterfeit investigation personnel of the entity. Additionally, or alternatively, the detection system may transmit the indication to a server device, such as a server device used for account management or a server device used for managing counterfeit incidents (e.g., for opening a counterfeit incident ticket). Transmitting the indication to the server device used for account management may cause flagging of an account into which deposit of the second note was attempted. The flag may cause the account to be locked (e.g., preventing deposits or withdrawals) and/or may indicate that the account is to be investigated.

As shown by reference number 145, additionally, or alternatively, an action may include causing the note handling device, that received the second note, to reject a deposit of the second note. Rejecting the deposit may include returning the second note without crediting the deposit to an account or confiscating the second note without crediting the deposit to an account. In some implementations, an action may include generating a complaint for a law enforcement entity (e.g., that includes information relating to the user that deposited the second note) and transmitting the complaint to a device of the law enforcement entity. In some implementations, an action may include automatically placing a phone call to a law enforcement entity. In some implementations, an action may include performing a forensic analysis of the second note (e.g., based on one or more withdrawals or deposits of the second note) to identify a user from which the second note originated.

By using image analysis of currency as well as data relating to a user that has withdrawn and/or deposited currency, the detection system may perform counterfeit detection with improved accuracy. Accordingly, the detection system conserves computing resources that otherwise may have been used to falsely identify currency as counterfeit or to fail to identify currency as counterfeit. In this way, the detection system efficiently utilizes computing resources used for counterfeit detection.

While the description herein relates to a single withdrawal event and a single deposit event, in some implementations, the detection system may obtain images of a note, as well as record a time and a location, in connection with multiple withdrawal events and/or multiple deposit events. Thus, the machine learning model may determine whether a note is counterfeit based on multiple withdrawal events and/or multiple deposit events, thereby improving an accuracy of the machine learning model. Moreover, while the description herein is described in terms of paper currency, the description herein is equally applicable checks, coins, and other physical forms of payment, and the term "note" used herein is intended to encompass these physical forms of payment. The use of the detection system to detect counterfeit currency is one example. In other examples, the detection system may be used to detect anomalous uses of currency, such as for money laundering or criminal activity, using similar techniques to those described herein.

As indicated above, FIGS. 1A-1F are provided as an example. Other examples may differ from what is described with regard to FIGS. 1A-1F.

Figure 2:
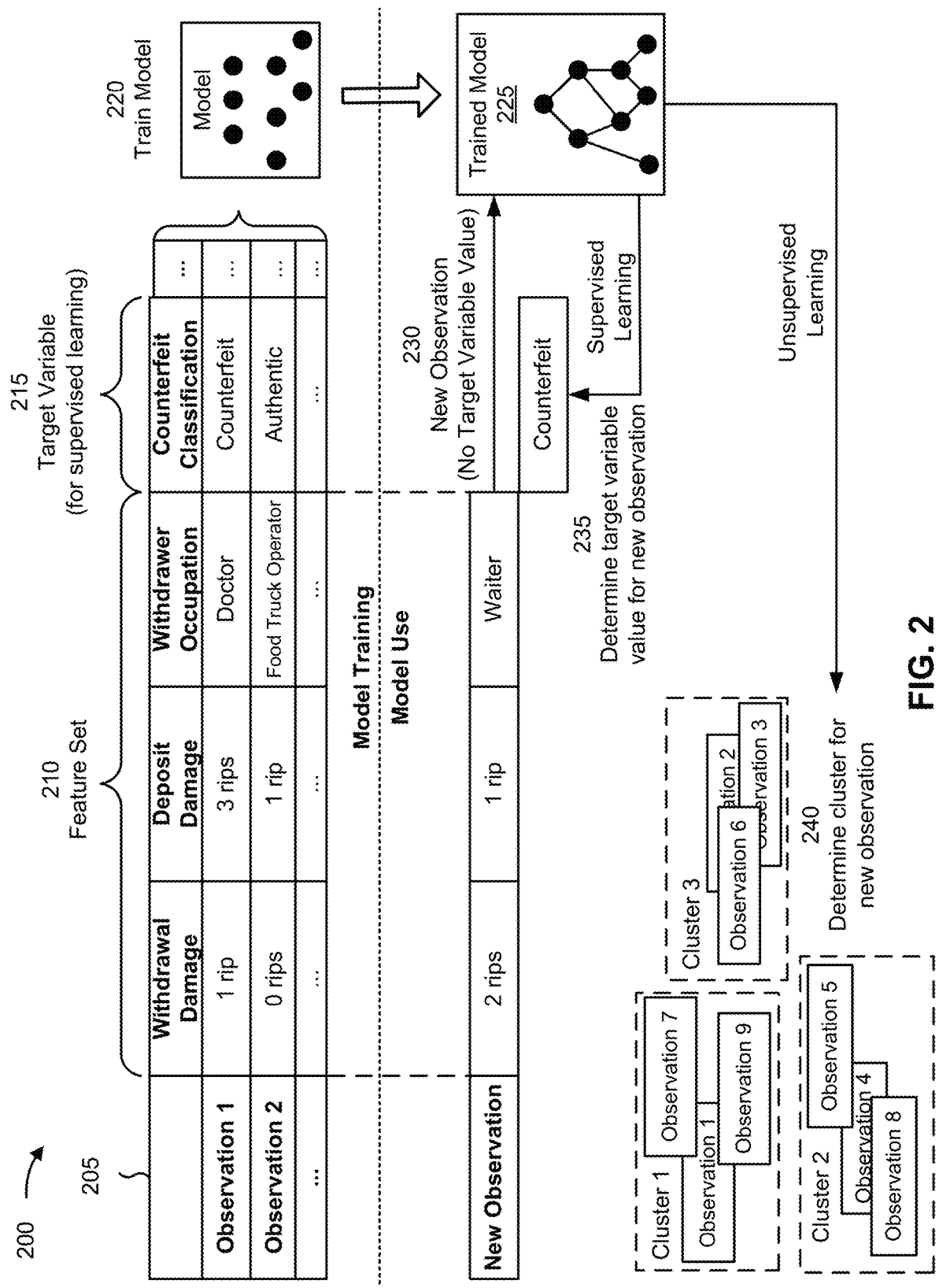
FIG. 2 is a diagram illustrating an example of training and using a machine learning model in connection with counterfeit detection using image analysis, in accordance with some embodiments of the present disclosure.

FIG. 2 is a diagram illustrating an example 200 of training and using a machine learning model in connection with counterfeit detection using image analysis. The machine learning model training and usage described herein may be performed using a machine learning system. The machine learning system may include or may be included in a computing device, a server, a cloud computing environment, or the like, such as the detection system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the note database, the user database, and/or the interaction database, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the note database, the user database, and/or the interaction database. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of withdrawal damage, a second feature of deposit damage, a third feature of withdrawer occupation, and so on. As shown, for a first observation, the first feature may have a value of 1 rip, the second feature may have a value of 3 rips, the third feature may have a value of doctor, and so on. These features and feature values are provided as examples, and may differ in other examples. For example, the feature set may include one or more of the following features: damage to a note at withdrawal, including a quantity, a size, and/or a location of rips, cuts, holes, missing portions, stray markings, and/or stains; a coloration of a note, including a color profile, color intensity levels, a color layering, discoloration levels, and/or color fading levels; a quality of a note, including a paper quality level, a wear level, and/or a translucency level; a time of withdrawal; a location of withdrawal; a time of deposit; a location of deposit; a time difference between the time of withdrawal and the time of deposit; a distance between the location of withdrawal and the location of deposit; an occupation of the withdrawer; an occupation of the depositor; an interaction history of the withdrawer, including entity categories for interactions, locations of interactions, amounts of interactions, times of interactions, distances of interactions from a residence location, frequency of interactions in a particular entity category (e.g., over a particular time period), frequency of interactions with a particular entity (e.g., over a particular time period), time between interactions in a particular entity category, time between interactions with a particular entity, average amount of interactions in a particular entity category (e.g., over a particular time period), and/or average amount of interactions with a particular entity (e.g., over a particular time period); and/or an interaction history of the depositor, including similar features to those described for the interaction history of the withdrawer.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is counterfeit classification, which has a value of counterfeit for the first observation. For example, the counterfeit classification for an observation may be counterfeit, authentic, or unknown.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. For example, using a neural network algorithm, the machine learning system may train a machine learning model to output (e.g., at an output layer) a counterfeit classification based on an input (e.g., at an input layer) indicating visual characteristics of a note at a time of withdrawal and deposit and data associated with a withdrawer of the note, as described elsewhere herein. In particular, the machine learning system, using the neural network algorithm, may train the machine learning model, using the set of observations from the training data, to derive weights for one or more nodes in the input layer, in the output layer, and/or in one or more hidden layers (e.g., between the input layer and the output layer). Nodes in the input layer may represent features of a feature set of the machine learning model, such as a first node representing withdrawal damage, a second node representing deposit damage, a third node representing withdrawer occupation, and so forth. One or more nodes in the output layer may represent output(s) of the machine learning model, such as a node indicating a counterfeit classification. The weights learned by the machine learning model facilitate transformation of the input of the machine learning model to the output of the machine learning model. After training, the machine learning system may store the machine learning model as a trained machine learning model 225 to be used to analyze new observations.

As an example, the machine learning system may obtain training data for the set of observations based on visual characteristic data of notes involved in historical withdrawals and deposits, information indicating times and locations of the historical withdrawals and deposits, and historical user data (e.g., occupation data and/or interaction data) associated with users performing the historical withdrawals and deposits. For example, the machine learning system may obtain the visual characteristic data and the information indicating times and locations from the notes database, as described elsewhere herein, and may obtain the historical user data from the user database and/or the interaction database, as described elsewhere herein.

As shown by reference number 230, the machine learning system may apply the trained machine learning model 225 to a new observation, such as by receiving a new observation and inputting the new observation to the trained machine learning model 225. As shown, the new observation may include a first feature value of 2 rips, a second feature value of 1 rip, a third feature value of waiter, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of counterfeit for the target variable of counterfeit classification for the new observation, as shown by reference number 235. Based on this prediction, the machine learning system may provide a recommendation, may provide output for determination of a recommendation, may perform an automated action, and/or may cause an automated action to be performed (e.g., by instructing another device to perform the automated action), among other examples. For example, the recommendation or the automated action may relate to one or more of the actions described in connection with FIG. 1F.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a particular cluster (e.g., a counterfeit cluster, an authentic cluster, or an unknown cluster, among other examples), then the machine learning system may provide a recommendation, perform an automated action, and/or may cause an automated action to be performed (e.g., by instructing another device to perform the automated action) based on classifying the new observation in a particular cluster.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include counterfeit classifications output by the machine learning model and results of subsequent manual counterfeit testing performed on notes classified as counterfeit.

In this way, the machine learning system may apply a rigorous and automated process to detect counterfeit notes. The machine learning system may enable recognition and/or identification of tens, hundreds, thousands, or millions of features and/or feature values for tens, hundreds, thousands, or millions of observations, thereby increasing accuracy and consistency and reducing delay associated with counterfeit detection relative to requiring computing resources to be allocated for tens, hundreds, or thousands of operators to manually detect counterfeit notes using the features or feature values.

As indicated above, FIG. 2 is provided as an example. Other examples may differ from what is described in connection with FIG. 2.

Figure 3:
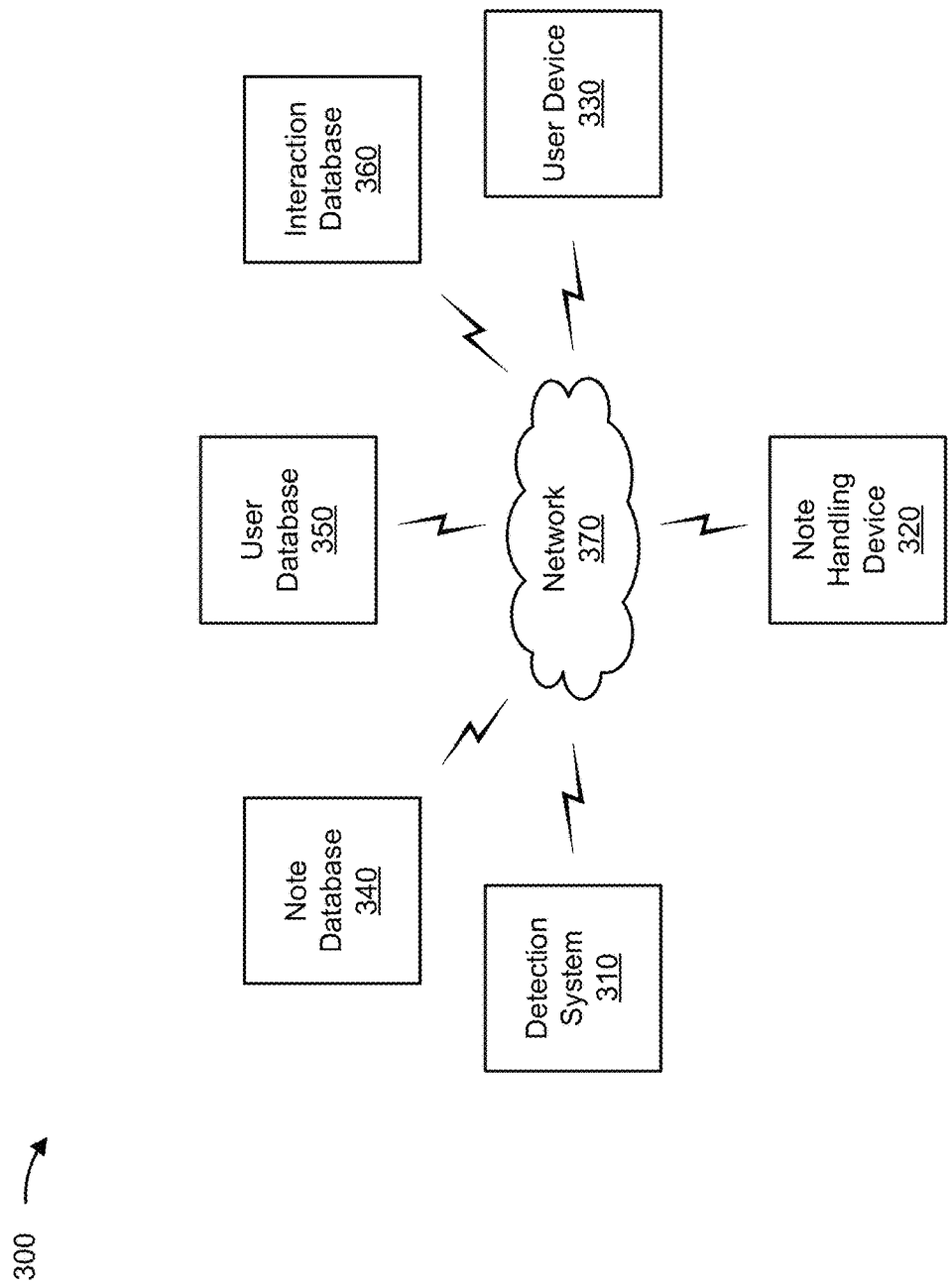
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a detection system 310, a note handling device 320, a user device 330, a note database 340, a user database 350, an interaction database 360, and/or a network 370. Devices of environment 300 may interconnect via wired connections, wireless connections, or a combination of wired and wireless connections.

The detection system 310 may include one or more devices capable of receiving, generating, storing, processing, providing, and/or routing information associated with counterfeit detection, as described elsewhere herein. The detection system 310 may include a communication device and/or a computing device. For example, the detection system 310 may include a server, such as an application server, a client server, a web server, a database server, a host server, a proxy server, a virtual server (e.g., executing on computing hardware), or a server in a cloud computing system. In some implementations, the detection system 310 may include computing hardware used in a cloud computing environment.

The note handling device 320 may include one or more devices capable of receiving, generating, storing, processing, providing, and/or routing information associated with counterfeit detection, as described elsewhere herein. For example, the note handling device 320 may include one or more devices capable of capturing images, accepting currency, and/or dispensing currency. The note handling device 320 may include a communication device and/or a computing device. For example, the note handling device 320 may include an ATM, a cash dispensing device, or a cash counting device.

The user device 330 may include one or more devices capable of receiving, generating, storing, processing, and/or providing information associated with counterfeit detection, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The note database 340 may include one or more devices capable of receiving, generating, storing, processing, and/or providing information associated with withdrawn and/or deposited notes, as described elsewhere herein. The note database 340 may include a communication device and/or a computing device. For example, the note database 340 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the note database 340 may store image data, image analysis data, and/or note data associated with withdrawn and/or deposited notes, as described elsewhere herein.

The user database 350 may include one or more devices capable of receiving, generating, storing, processing, and/or providing information associated with users having accounts maintained by an entity, as described elsewhere herein. The user database 350 may include a communication device and/or a computing device. For example, the user database 350 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the user database 350 may store residence data and/or occupation data associated with one or more users, as described elsewhere herein.

The interaction database 360 may include one or more devices capable of receiving, generating, storing, processing, and/or providing information associated with interactions (e.g., transactions) of one or more users, as described elsewhere herein. The interaction database 360 may include a communication device and/or a computing device. For example, the interaction database 360 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the interaction database 360 may store interaction data relating to interactions (e.g., transactions) between one or more users and one or more entities (e.g., merchants), as described elsewhere herein.

The network 370 may include one or more wired and/or wireless networks. For example, the network 370 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 370 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
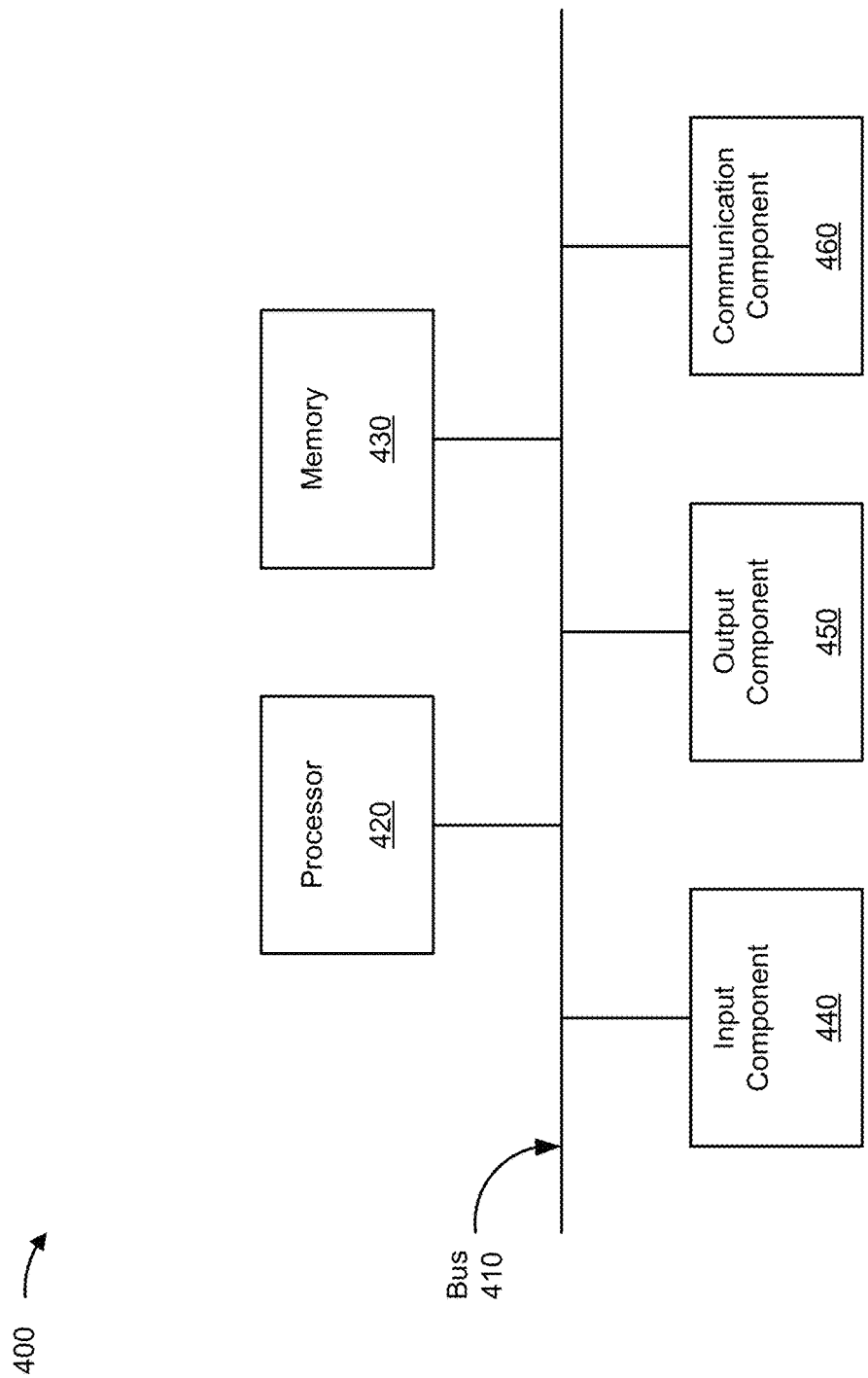
FIG. 4 is a diagram of example components of a device associated with counterfeit detection using image analysis, in accordance with some embodiments of the present disclosure.

FIG. 4 is a diagram of example components of a device 400 associated with counterfeit detection using image analysis. The device 400 may correspond to detection system 310, note handling device 320, user device 330, note database 340, user database 350, and/or interaction database 360. In some implementations, detection system 310, note handling device 320, user device 330, note database 340, user database 350, and/or interaction database 360 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
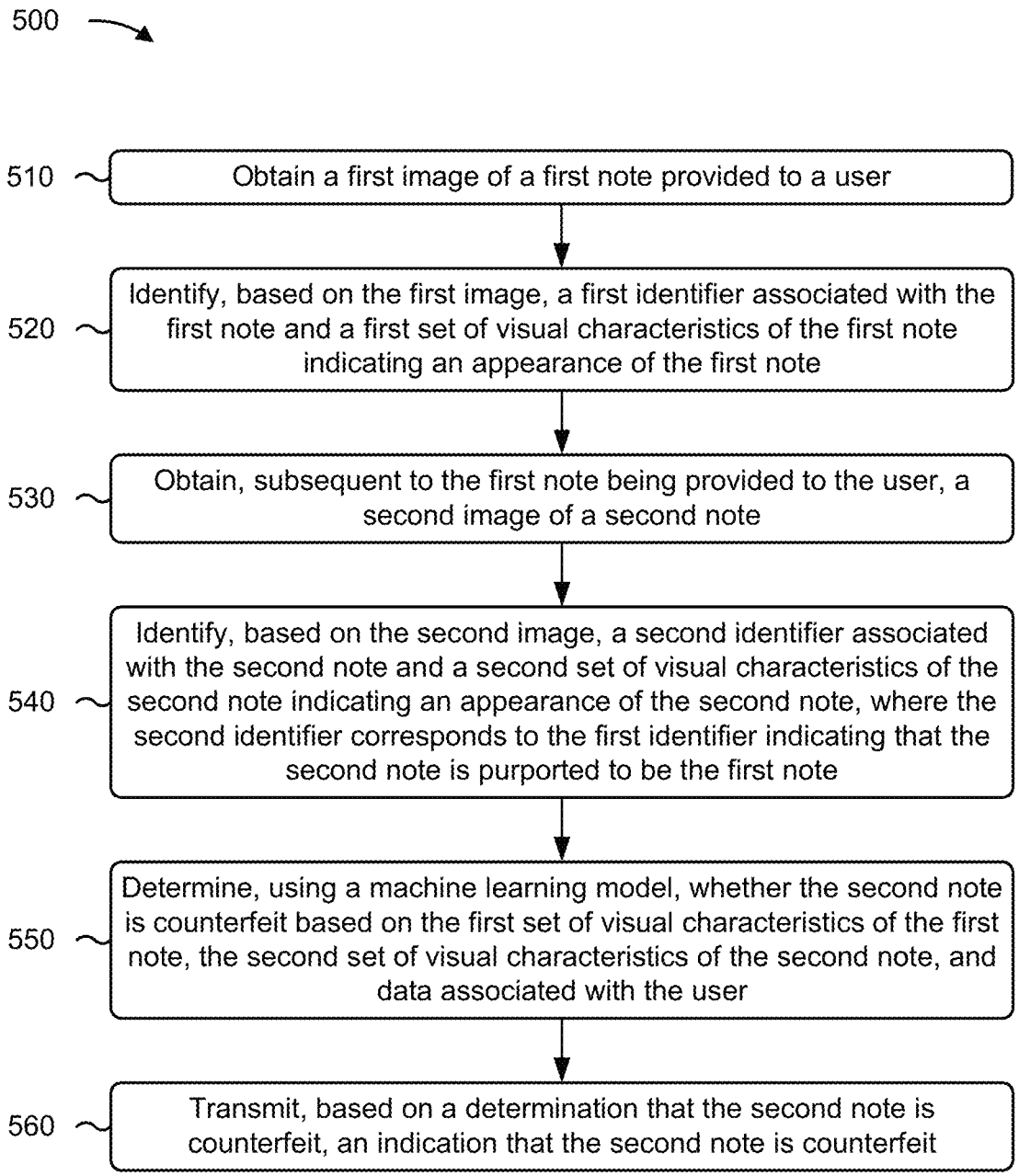
FIG. 5 is a flowchart of an example process associated with counterfeit detection using image analysis, in accordance with some embodiments of the present disclosure.

FIG. 5 is a flowchart of an example process 500 associated with counterfeit detection using image analysis. In some implementations, one or more process blocks of FIG. 5 may be performed by the detection system 310. In some implementations, one or more process blocks of FIG. 5 may be performed by another device or a group of devices separate from or including the detection system 310, such as the note handling device 320, the user device 330, the note database 340, the user database 350, and/or the interaction database 360. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include obtaining a first image of a first note provided to a user (block 510). For example, the detection system 310 (e.g., using processor 420, memory 430, input component 440, and/or communication component 460) may obtain a first image of a first note provided to a user, as described above in connection with reference number 105 of FIG. 1A. As an example, the first note may be provided to the user in connection with a withdrawal performed by the user.

As further shown in FIG. 5, process 500 may include identifying, based on the first image, a first identifier associated with the first note and a first set of visual characteristics of the first note indicating an appearance of the first note (block 520). For example, the detection system 310 (e.g., using processor 420 and/or memory 430) may identify, based on the first image, a first identifier associated with the first note and a first set of visual characteristics of the first note indicating an appearance of the first note, as described above in connection with reference number 110 of FIG. 1B. As an example, image analysis of the first image may be performed to identify a first identifier (e.g., a serial number) associated with the first note and/or a first set of visual characteristics of the first note that indicate an appearance of the first note.

As further shown in FIG. 5, process 500 may include obtaining, subsequent to the first note being provided to the user, a second image of a second note (block 530). For example, the detection system 310 (e.g., using processor 420, memory 430, input component 440, and/or communication component 460) may obtain, subsequent to the first note being provided to the user, a second image of a second note, as described above in connection with reference number 120 of FIG. 1C. As an example, the second note may be received in connection with a deposit performed by the user or a different user.

As further shown in FIG. 5, process 500 may include identifying, based on the second image, a second identifier associated with the second note and a second set of visual characteristics of the second note indicating an appearance of the second note, where the second identifier corresponds to the first identifier indicating that the second note is purported to be the first note (block 540). For example, the detection system 310 (e.g., using processor 420 and/or memory 430) may identify, based on the second image, a second identifier associated with the second note and a second set of visual characteristics of the second note indicating an appearance of the second note, as described above in connection with reference number 125 of FIG. 1D. As an example, image analysis of the second image may be performed to identify a second identifier (e.g., a serial number) associated with the second note and/or a second set of visual characteristics of the second note that indicate an appearance of the second note. In some implementations, the second identifier corresponding to the first identifier indicates that the second note is purported to be the first note.

As further shown in FIG. 5, process 500 may include determining, using a machine learning model, whether the second note is counterfeit based on the first set of visual characteristics of the first note, the second set of visual characteristics of the second note, and data associated with the user (block 550). For example, the detection system 310 (e.g., using processor 420 and/or memory 430) may determine, using a machine learning model, whether the second note is counterfeit based on the first set of visual characteristics of the first note, the second set of visual characteristics of the second note, and data associated with the user, as described above in connection with reference number 135 of FIG. 1E. As an example, the second note may have stains that are not present on the first note (e.g., the second note may have a different appearance than the first note), and the machine learning model may classify the second note as counterfeit if the interaction history associated with the user does not indicate that the user engages in activities in which cash may be handled in a manner that has a high probability of causing stains (e.g., frequently playing golf or frequently going to bars) and/or if the user does not have an occupation in which cash may be handled in a manner that has a high probability of causing stains (e.g., operating a food truck).

As further shown in FIG. 5, process 500 may include transmitting, based on a determination that the second note is counterfeit, an indication that the second note is counterfeit (block 560). For example, the detection system 310 (e.g., using processor 420, memory 430, and/or communication component 460) may transmit, based on a determination that the second note is counterfeit, an indication that the second note is counterfeit, as described above in connection with reference number 140 of FIG. 1F. As an example, the indication may be transmitted to a user device, such as a user device that captured the first image of the first note or the second image of the second note using a counterfeit detection application, or a user device used by a bank teller (e.g., that received the second note for deposit) or used by counterfeit investigation personnel.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1F. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for counterfeit detection using image analysis, the system comprising:
   one or more memories; and
   one or more processors, communicatively coupled to the one or more memories, configured to:
      obtain a first image of a first note that is provided to a user from an entity;
      identify, based on the first image, a first identifier associated with the first note and a first set of visual characteristics of the first note indicating an appearance of the first note;
      obtain a second image of a second note that is incoming to the entity;
      identify, based on the second image, a second identifier associated with the second note and a second set of visual characteristics of the second note indicating an appearance of the second note,
         wherein the second identifier corresponds to the first identifier indicating that the second note is purported to be the first note;
      determine, using a machine learning model, whether the second note is counterfeit based on the first set of visual characteristics of the first note, the second set of visual characteristics of the second note, and at least one of an occupation of the user or an interaction history associated with the user; and
      transmit, based on a determination that the second note is counterfeit, an indication that the second note is counterfeit.

2. The system of claim 1, wherein the one or more processors are further configured to:
   generate information indicating an association between the first identifier, the first set of visual characteristics of the first note, and the user.

3. The system of claim 1, wherein the one or more processors are further configured to:
   retrieve, based on the first identifier corresponding to the second identifier, information indicating the first set of visual characteristics of the first note and data indicating the at least one of the occupation of the user or the interaction history associated with the user.

4. The system of claim 1, wherein the one or more processors, to determine, using the machine learning model, whether the second note is counterfeit, are configured to:
   determine, using the machine learning model, whether the second note is counterfeit based on the first set of visual characteristics of the first note, the second set of visual characteristics of the second note, the at least one of the occupation of the user or the interaction history associated with the user, a first time of the first note being provided to the user, a second time of the second note incoming to the entity, a first location of the first note being provided to the user, and a second location of the second note incoming to the entity.

5. The system of claim 1, wherein the first set of visual characteristics of the first note relate to damage to the first note, a coloration of the first note, or a quality of the first note, and
   wherein the second set of visual characteristics of the second note relate to damage to the second note, a coloration of the second note, or a quality of the second note.

6. The system of claim 1, wherein the one or more processors are further configured to:
   perform optical character recognition on at least a portion of the first image that is associated with the first identifier; and
   perform optical character recognition on at least a portion of the second image that is associated with the second identifier.

7. The system of claim 1, wherein the one or more processors are further configured to:
   cause a note handling device to reject a deposit of the second note based on the determination that the second note is counterfeit.

8. The system of claim 1, wherein the interaction history indicates one or more historical interactions between the user and one or more merchants in connection with an account of the user maintained by the entity.

9. A method of counterfeit detection using image analysis, comprising:
   obtaining, by a device, a first image of a first note provided to a user;
   identifying, by the device and based on the first image, a first identifier associated with the first note and a first set of visual characteristics of the first note indicating an appearance of the first note;
   obtaining, by the device and subsequent to the first note being provided to the user, a second image of a second note;
   identifying, by the device and based on the second image, a second identifier associated with the second note and a second set of visual characteristics of the second note indicating an appearance of the second note,
      wherein the second identifier corresponds to the first identifier indicating that the second note is purported to be the first note;
   determining, by the device and using a machine learning model, whether the second note is counterfeit based on the first set of visual characteristics of the first note, the second set of visual characteristics of the second note, and data associated with the user; and
   transmitting, by the device and based on a determination that the second note is counterfeit, an indication that the second note is counterfeit.

10. The method of claim 9, wherein the data associated with the user indicates an occupation of the user.

11. The method of claim 9, wherein the data associated with the user indicates an interaction history of the user, and
   wherein the interaction history indicates one or more historical interactions between the user and one or more merchants in connection with an account of the user.

12. The method of claim 9, wherein the second note is from a different user, and
   wherein determining, using the machine learning model, whether the second note is counterfeit comprises:
      determining, using the machine learning model, whether the second note is counterfeit based on the first set of visual characteristics of the first note, the second set of visual characteristics of the second note, the data associated with the user, and additional data associated with the different user.

13. The method of claim 9, wherein the first set of visual characteristics of the first note relate to damage to the first note, a coloration of the first note, or a quality of the first note, and
   wherein the second set of visual characteristics of the second note relate to damage to the second note, a coloration of the second note, or a quality of the second note.

14. The method of claim 9, wherein the machine learning model is trained to classify a note into a first classification indicating that the note is counterfeit or into a second classification indicating that the note is authentic.

15. A non-transitory computer-readable medium storing a set of instructions for counterfeit detection using image analysis, the set of instructions comprising:
   one or more instructions that, when executed by one or more processors of a device, cause the device to:
      obtain a first image of a first note provided to a user;
      identify, based on the first image, a first identifier associated with the first note and a first set of visual characteristics of the first note indicating an appearance of the first note;
      obtain a second image of a second note;
      identify, based on the second image, a second identifier associated with the second note and a second set of visual characteristics of the second note indicating an appearance of the second note,
         wherein the second identifier corresponds to the first identifier indicating that the second note is purported to be the first note;
      determine whether the second note is counterfeit based on the first set of visual characteristics of the first note and the second set of visual characteristics of the second note; and
      perform one or more actions based on a determination that the second note is counterfeit.

16. The non-transitory computer-readable medium of claim 15, wherein the one or more instructions, that cause the device to obtain the first image or to obtain the second image, cause the device to:
   receive the first image or the second image from an automated teller machine.

17. The non-transitory computer-readable medium of claim 15, wherein the one or more instructions, that cause the device to obtain the first image or to obtain the second image, cause the device to:
   receive the first image or the second image from a user device.

18. The non-transitory computer-readable medium of claim 15, wherein the one or more instructions, when executed by the one or more processors, further cause the device to:
   cause a note handling device to reject a deposit of the second note based on the determination that the second note is counterfeit.

19. The non-transitory computer-readable medium of claim 15, wherein the first set of visual characteristics of the first note relate to damage to the first note, a coloration of the first note, or a quality of the first note, and
   wherein the second set of visual characteristics of the second note relate to damage to the second note, a coloration of the second note, or a quality of the second note.

20. The non-transitory computer-readable medium of claim 15, wherein the one or more instructions, that cause the device to identify, based on the first image, the first identifier and the first set of visual characteristics, cause the device to:
- perform image analysis on the first image to identify the first identifier and the first set of visual characteristics, and
- wherein the one or more instructions, that cause the device to identify, based on the second image, the second identifier and the second set of visual characteristics, cause the device to:
  - perform image analysis on the second image to identify the second identifier and the second set of visual characteristics.

* * * * *